US012668179B2

(12) United States Patent (10) Patent No.: US 12,668,179 B2
Ito et al. (45) Date of Patent: Jun. 30, 2026

(54) NOTIFICATION SYSTEM AND VEHICLE COMPRISING NOTIFICATION SYSTEM

(71) Applicant: TS TECH CO., LTD., Asaka (JP)

(72) Inventors: Takayoshi Ito, Tochigi (JP); Yuichiro Hoshi, Tochigi (JP); Kohei Kowata, Tochigi (JP); Hayato Shimazaki, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 14 days.

(21) Appl. No.: 18/773,623

(22) Filed: Jul. 16, 2024

(65) Prior Publication Data

US 2024/0367584 A1     Nov. 7, 2024

Related U.S. Application Data

(63) Continuation of application No. 17/436,120, filed as application No. PCT/JP2020/008891 on Mar. 3, 2020, now abandoned.

(30) Foreign Application Priority Data

Mar. 4, 2019     (JP) .................................. 2019-039020

(51) Int. Cl.
*B60Q 9/00* (2006.01)
*B60N 2/00* (2006.01)
*G08B 21/24* (2006.01)
(52) U.S. Cl.
CPC ............... *B60Q 9/00* (2013.01); *B60N 2/002* (2013.01); *B60N 2/0021* (2023.08); *G08B 21/24* (2013.01)
(58) Field of Classification Search
CPC ........ B60Q 9/00; B60N 2/002; B60N 2/0021; B60N 2/995; B60N 2002/981; G08B 21/24; B60R 7/043; B60R 25/40; A47C 7/62
See application file for complete search history.

(56) References Cited

U.S. PATENT DOCUMENTS 7,522,041 B1     4/2009   Parish
9,950,691 B2     4/2018   Kameyama et al.
(Continued)

FOREIGN PATENT DOCUMENTS

CN          104553908 A      4/2015
CN          106882091 A      6/2017
(Continued)

OTHER PUBLICATIONS

International Search Report and Written Opinion with English Translation issued in PCT/JP2020/008891, Dated Apr. 7, 2020 (7 pages).

(Continued)

*Primary Examiner* — Brian Wilson
(74) *Attorney, Agent, or Firm* — Dority & Manning, P.A.

(57)          ABSTRACT

There is provided a notification system that, when a user misplaces luggage or a mobile terminal on a seat, promptly notifies the user of the misplaced luggage or the misplaced mobile terminal. A notification system 1 includes a seat S; a luggage detection unit 31 that detects a presence of luggage on the seat or in the vicinity of the seat, the luggage being held by a user; a seating detection unit 32 that detects whether or not the user is seated on the seat; a notification unit 33 that notifies the user of presence or absence information of the luggage; and a control unit 20 that is connected to and controls the luggage detection unit and the notification unit. When the luggage detection unit detects the luggage after an elapse of a predetermined time from when the seating detection unit has detected that the user has left the seat, the control unit causes the notification unit to notify the user that the luggage has been detected.

16 Claims, 14 Drawing Sheets

(56) References Cited

U.S. PATENT DOCUMENTS

| | | | |
|---|---|---|---|
| 10,303,961 B1 | 5/2019 | Stoffel et al. | |
| 2003/0085597 A1* | 5/2003 | Ludeke | B64D 11/06 |
| | | | 297/184.14 |
| 2008/0204264 A1 | 8/2008 | Sakai | |
| 2015/0248830 A1 | 9/2015 | Okano et al. | |
| 2016/0332535 A1 | 11/2016 | Bradley et al. | |
| 2017/0050537 A1 | 2/2017 | Fujii et al. | |
| 2017/0200355 A1* | 7/2017 | Gruenbaum | B61D 41/00 |
| 2018/0365967 A1 | 12/2018 | Takagi | |
| 2019/0116421 A1* | 4/2019 | Kano | H04R 3/04 |
| 2019/0197325 A1 | 6/2019 | Reiley et al. | |
| 2019/0344707 A1* | 11/2019 | Nelson | B60N 2/58 |
| 2019/0367170 A1 | 12/2019 | Carlioz et al. | |
| 2020/0065717 A1* | 2/2020 | DeLuca | G06Q 10/02 |
| 2020/0070715 A1* | 3/2020 | Krause | B60Q 3/76 |
| 2022/0144168 A1 | 5/2022 | Ito et al. | |

FOREIGN PATENT DOCUMENTS

| | | | |
|---|---|---|---|
| JP | H02208163 A | 8/1990 | |
| JP | H1080336 A | 3/1998 | |
| JP | 2004166459 A | 6/2004 | |
| JP | 2004213597 A | 7/2004 | |
| JP | 2007105225 A | 4/2007 | |
| JP | 2007156666 A | 6/2007 | |
| JP | 2007-183749 A | 7/2007 | |
| JP | 2008273509 A | 11/2008 | |
| JP | 2014-059835 A | 4/2014 | |
| JP | 2014-060674 A | 4/2014 | |
| JP | 2014174739 A | 9/2014 | |
| JP | 2015-041344 A | 3/2015 | |
| JP | 2016068337 A | 5/2016 | |
| JP | 2016068667 A | 5/2016 | |
| JP | 2017-039475 A | 2/2017 | |
| JP | 2017182301 A | 10/2017 | |
| JP | 2017210128 A | 11/2017 | |
| JP | 2019008352 A | 1/2019 | |
| WO | WO 2015/025435 A1 | 2/2015 | |

OTHER PUBLICATIONS

Decision of Refusal (w/ Machine translation) for corresponding Application No. 2019-039020, dated May 7, 2024, 4 pages.

Japanese Decision of Dismissal of Amendment (w/ Machine translation) for corresponding Application No. 2019-039020, dated May 7, 2024, 6 pages.

Japanese Notice of Reasons for Refusal (w/ Machine translation) for corresponding Application No. 2019-039020, mailed Feb. 20, 2024, 12 pages.

Japanese Notice of Reasons for Refusal (w/ English translation) for corresponding Application No. 2019-039020, mailed Sep. 26, 2023, 12 pages.

Japanese Notice of Reasons for Refusal (w/ English translation) for corresponding Application No. 2019-039020, dated Apr. 4, 2023, 12 pages.

US Final Office Action for corresponding U.S. Appl. No. 17/436,120, dated Mar. 21, 2024, 13 pages.

US Non-Final Office Action for corresponding U.S. Appl. No. 17/436,120, dated Dec. 7, 2023, 9 pages.

US Final Office Action for corresponding U.S. Appl. No. 17/436,120, dated Jul. 19, 2023, 9 pages.

US Non-Final Office Action for corresponding U.S. Appl. No. 17/436,120, dated Feb. 2, 2023, 9 pages.

Japanese Office Action (w/English translation) for corresponding Application No. 2024-130136, mailed on Sep. 30, 2025, 10 pages.

* cited by examiner

NOTIFICATION SYSTEM AND VEHICLE COMPRISING NOTIFICATION SYSTEM

CROSS-REFERENCE TO RELATED APPLICATIONS

This application is a continuation of U.S. patent application Ser. No. 17/346,120, filed on Sep. 3, 2021, which is the U.S. National Stage entry of International Application No. PCT/JP2020/008891, filed under the Patent Cooperation Treaty on Mar. 3, 2020, which claims priority to Japanese Patent Application No. 2019-039020, filed on Mar. 4, 2019, all of which are hereby incorporated herein by reference in their entireties for all purposes.

TECHNICAL FIELD

The present invention relates to a notification system and a vehicle equipped with the notification system, and particularly, to a notification system that notifies a user of misplacement of luggage, and a vehicle equipped with the notification system.

BACKGROUND ART

In recent years, as a method for using an automobile, a vehicle sharing system has been used in which a plurality of users (members) use one automobile in common. The automobile used in common is referred to as a shared vehicle.

The vehicle sharing system includes a host computer of a management center that manages shared vehicles; terminal devices such as computers or mobile phones owned by users who are members; and a communication network that connects the terminal devices and the host computer. When a user uses a shared vehicle, the user connects to the host computer via the communication network using a terminal device. Then, the user inquires whether or not a shared vehicle is available, and transmits reservation information including the date and time of use, personal information, and the like to the host computer to make a reservation for the available vehicle (for example, refer to PATENT LITERA-TURE 1).

CITATION LIST

Patent Literature

PATENT LITERATURE 1: JP 2007-183749 A

SUMMARY OF INVENTION

Technical Problem

By the way, in the vehicle sharing system, since a plurality of users use one vehicle, unlike vehicles owned by individuals, luggage or the like of the individuals cannot be placed in the vehicle at all times. Therefore, after the end of the use of the shared vehicle, in order to bring out all his or her own luggage, paying attention to misplacement of the luggage is required.

Therefore, the present invention has been made in view of the above problem, and an object of the present invention is to provide a notification system that, when a user misplaces luggage or a mobile terminal on a seat, promptly notifies the user of the misplaced luggage or the misplaced mobile terminal, and a vehicle equipped with the notification system.

Solution to Problem

In order to solve the above problem, according to an aspect of the present invention, there is provided a notification system including: a seat; a luggage detection unit that detects a presence of luggage on the seat or in the vicinity of the seat, the luggage being held by a user; a seating detection unit that detects whether or not the user is seated on the seat; a notification unit that notifies the user of presence or absence information of the luggage; and a control unit that is connected to and controls the luggage detection unit and the notification unit. When the luggage detection unit detects the luggage after an elapse of a predetermined time from when the seating detection unit has detected that the user has left the seat, the control unit causes the notification unit to notify the user that the luggage has been detected.

In the notification system of the present invention configured as described above, when the luggage detection unit detects the luggage after the elapse of the predetermined time from after the user has left the seat, the notification unit notifies the user that the luggage has been detected. Therefore, the misplacement of the luggage can be suppressed.

In addition, in the notification system, it is preferable that the luggage is a mobile terminal owned by the user, the luggage detection unit includes a charging device that charges the mobile terminal, and the luggage detection unit detects a state of connection between the charging device and the mobile terminal to detect a presence of the mobile terminal.

The misplacement of the mobile terminal can be detected with a simple device.

In addition, in the notification system, it is preferable that the charging device is configured to supply electricity to the mobile terminal wirelessly by means of an electromagnetic wave, and the luggage detection unit detects whether or not the charging device is charging the mobile terminal, to detect a presence of the mobile terminal.

Even when electricity is wirelessly supplied to the mobile terminal, a presence of the mobile terminal can be detected, and the misplacement of the mobile terminal can be detected.

In addition, in the notification system, it is preferable that the luggage detection unit is a load sensor that detects a load of the luggage disposed on the seat or in the vicinity of the seat, and the luggage detection unit detects the load to detect a presence of the luggage.

Since the load sensor is used as the luggage detection unit, luggage other than the mobile terminal can also be detected, and since a notification about a presence of the luggage is made, the misplacement of the luggage can be suppressed.

In addition, in the notification system, it is preferable that the luggage detection unit includes an infrared sensor or an ultrasonic sensor, and the infrared sensor or the ultrasonic sensor detects a presence of the luggage.

Since the infrared sensor or the ultrasonic sensor is used, a presence of the luggage can be more simply detected.

In addition, in the notification system, it is preferable that the notification unit is a lamp or a display provided in the seat, and when the luggage detection unit detects a presence of the luggage, the control unit causes the lamp to emit light or causes the display to display a message to notify the user that the luggage has been detected.

Since the lamp or the display is used as the notification unit, the user can be visually notified of misplacement of the luggage.

In addition, in the notification system, it is preferable that the notification unit is a speaker provided in the seat, and when the detection unit detects a presence of the luggage, the control unit causes the speaker to issue a sound to notify the user that the luggage has been detected.

Since the speaker is used as the notification unit, the user can be notified of misplacement of the luggage by means of the sense of hearing.

In addition, in the notification system, it is preferable that the notification unit is a communication device, and when the luggage detection unit detects a presence of the luggage, the control unit causes the communication device to transmit a predetermined message to a mobile terminal to notify that the luggage has been detected, the mobile terminal being owned by the user.

Since the communication device is used as the notification unit, even when the user is away from the vehicle, a notification about misplacement of the luggage can be made.

Advantageous Effects of Invention

According to the present invention, when the luggage detection unit detects the luggage after the elapse of the predetermined time from after the user has left the seat, the notification unit notifies the user that the luggage has been detected. Therefore, the misplacement of the luggage can be suppressed.

In addition, when the luggage is the mobile terminal of the user, the luggage detection unit detects the state of connection to the charging device, so that the misplacement of the mobile terminal can be detected with a simple configuration.

In addition, even when electricity is wirelessly supplied to the mobile terminal, it is detected whether or not the mobile terminal is being charged, so that a presence of the mobile terminal can be detected and the misplacement of the mobile terminal can be detected.

In addition, since the load sensor is used as the luggage detection unit, luggage other than the mobile terminal can also be detected, and since a notification about a presence of the luggage is made, the misplacement of the luggage can be suppressed.

In addition, since the infrared sensor or the ultrasonic sensor is used as the luggage detection unit, a presence of the luggage can be more simply detected.

In addition, since the lamp or the display is used as the notification unit, the user can be visually notified of misplacement of the luggage.

In addition, since the speaker is used as the notification unit, the user can be notified of misplacement of the luggage by means of the sense of hearing.

In addition, since the communication device is used as the notification unit to transmit a message to the mobile terminal of the user, even when the user is away from the vehicle, a notification about misplacement of the luggage can be made.

DESCRIPTION OF EMBODIMENTS

Hereafter, a notification system according to an embodiment of the present invention (hereafter, the present embodiment) will be described with reference to FIGS. 1 to 3.

Incidentally, the embodiment to be described below is merely one example to facilitate understanding of the present invention, and does not limit the present invention. Namely, the shapes, dimensions, dispositions, and the like of members to be described below can be changed or improved without departing from the concept of the present invention, and it goes without saying that the present invention includes equivalents thereof. In addition, in the following embodiment, the same or similar components are denoted by common reference signs, and in order to facilitate understanding, the scales of the drawings are appropriately changed.

Figure 1:
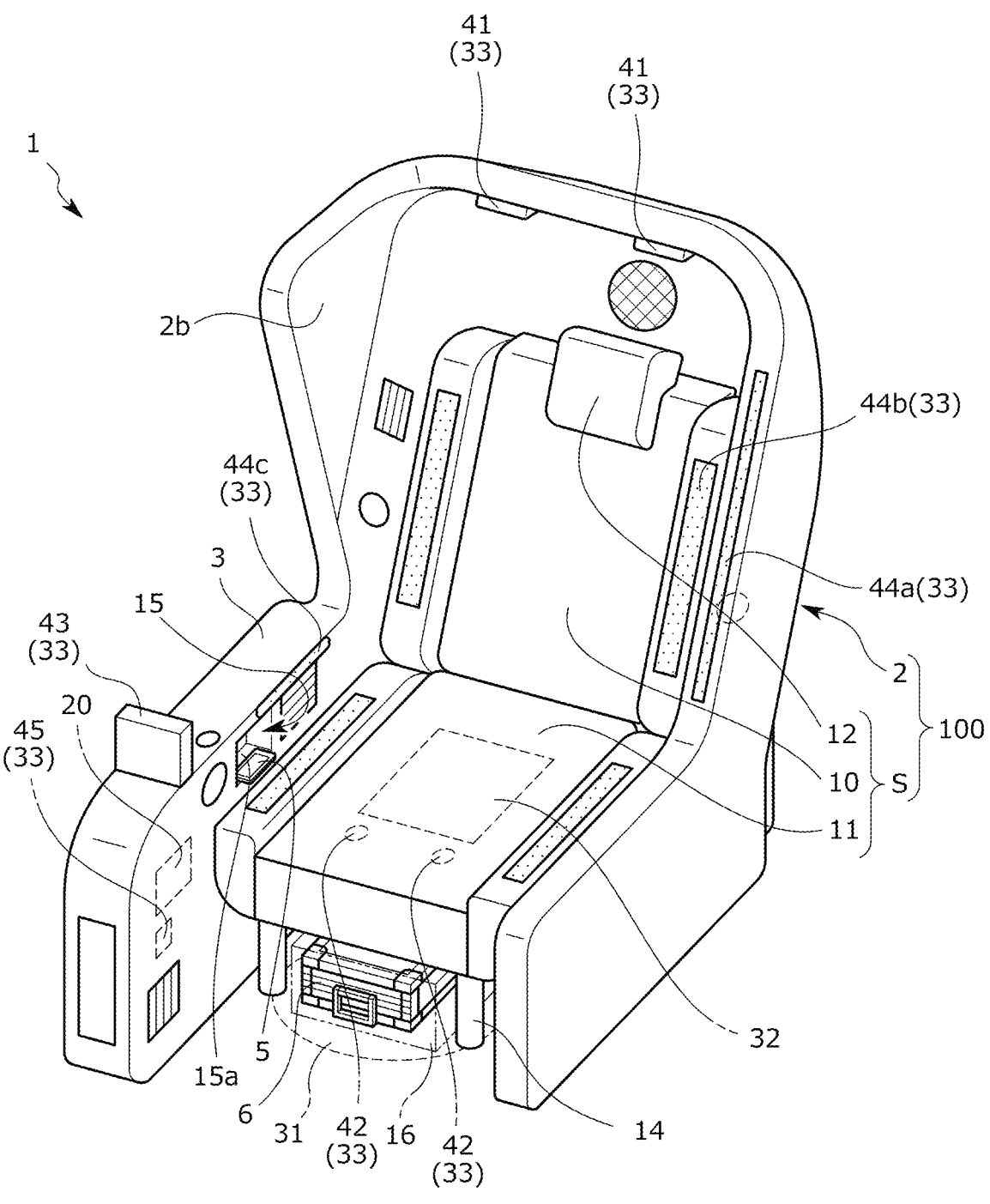
FIG. 1 is a perspective view illustrating an exterior of a notification system according to the present embodiment.

In the following description, a "front to back direction" means a front to back direction when seen from a seated occupant (user) of a vehicle seat S as illustrated in FIG. 1, and is a direction coinciding with a travel direction of a vehicle. A "seat width direction" means a lateral width direction of the vehicle seat S, and coincides with a right to left direction when seen from the seated occupant of the vehicle seat S. In addition, an "up to down direction" means a height direction of the vehicle seat S, and coincides with an up to down direction of the vehicle seat S as illustrated in FIG. 1.

A notification system 1 includes the vehicle seat S (seat); a luggage detection unit 31 that detects a presence of luggage 6 on the vehicle seat S or in the vicinity of the vehicle seat S, the luggage 6 being held by a user; a seating detection unit 32 that detects whether or not the user is seated on the vehicle seat S; a notification unit 33 that notifies the user of presence or absence information of the luggage 6; and an electronic control unit (ECU) 20 that is connected to and controls the luggage detection unit 31, the seating detection unit 32, and the notification unit 33. When the luggage detection unit 31 detects the luggage 6 (also including a mobile terminal 5) after the elapse of a predetermined time from when the seating detection unit 32 has detected that the user has left the seat, the ECU 20 causes the notification unit 33 to notify the user that the luggage 6 has been detected.

The vehicle seat S of the notification system 1 is a seat used in a shared vehicle or the like. In FIG. 1, only one vehicle seat S is illustrated, but a plurality of the vehicle seats S can be mounted in the shared vehicle, and a plurality of users can use and get in and out of one shared vehicle. In the shared vehicle, the vehicle seats S having the same configuration are disposed in front of, behind, or on the right or left of the vehicle seat S illustrated in FIG. 1.

As illustrated in FIG. 1, the vehicle seat S includes a seat back 10, a seat cushion 11, a headrest 12, and a seat support portion 14. A shell device 2 is provided around the vehicle seat S, specifically, is provided in the vicinity of the vehicle seat S to surround the vehicle seat S. The shell device 2 is an enclosure provided with the aim of blocking the eyes of a neighboring user and securing the privacy of the user, and is formed in a shape to cover right, left, and upper portions of the vehicle seat S. In addition, the vehicle seat S and the shell device 2 are collectively referred to as a seat apparatus 100. The shell device 2 will be described in detail later.

The notification system 1 of the present embodiment is a system mounted in the seat apparatus 100 including the vehicle seat S and the shell device 2, and the ECU 20 is installed in the shell device 2 of the seat apparatus 100. A location where the ECU 20 is installed is not limited to the shell device 2, and may be the inside of the vehicle seat S or on a floor or under the floor of the shared vehicle.

Figure 2:
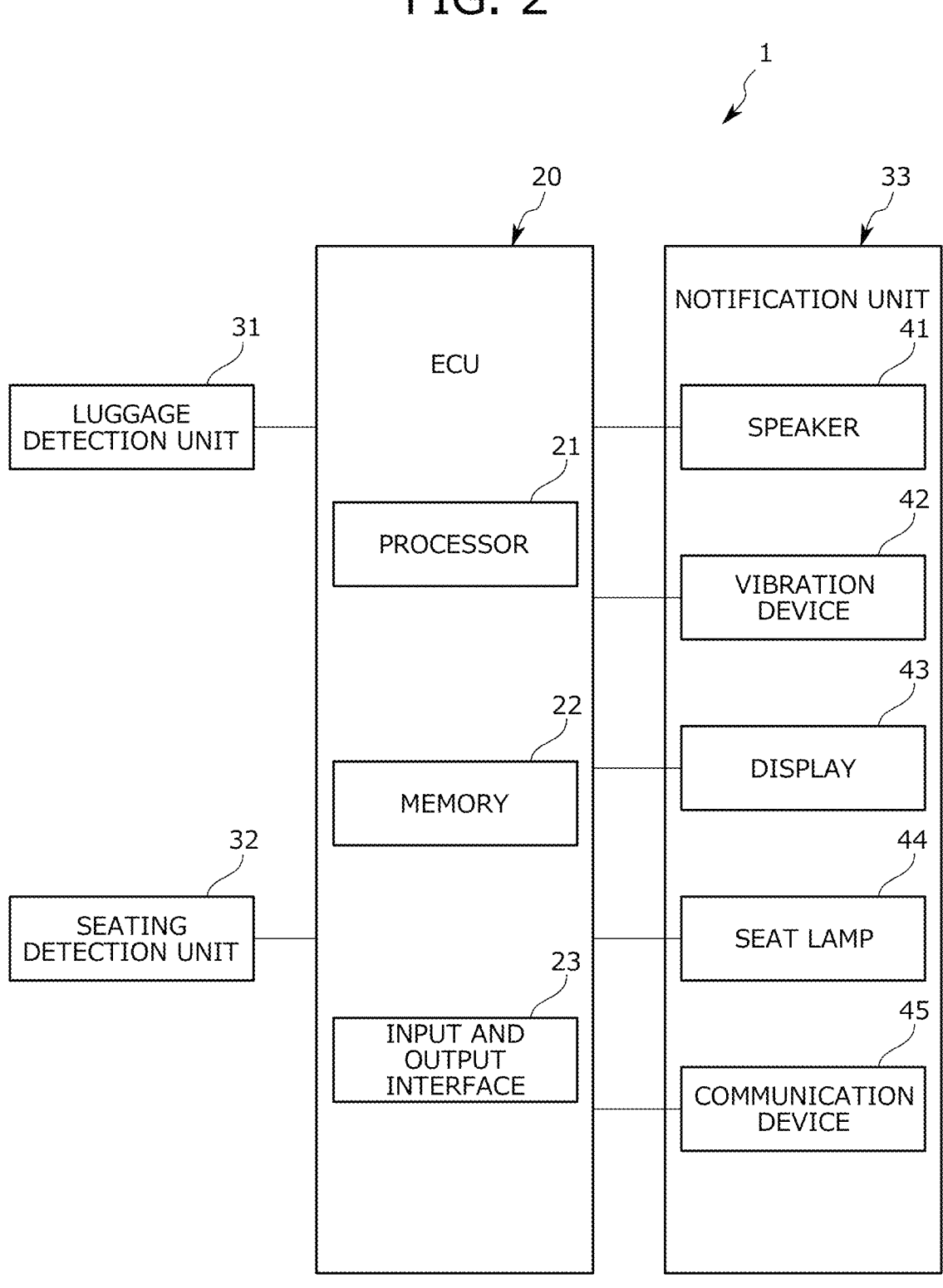
FIG. 2 is a block diagram illustrating an electronic control unit (ECU) of the notification system and control targets of the ECU.
Figure 3:
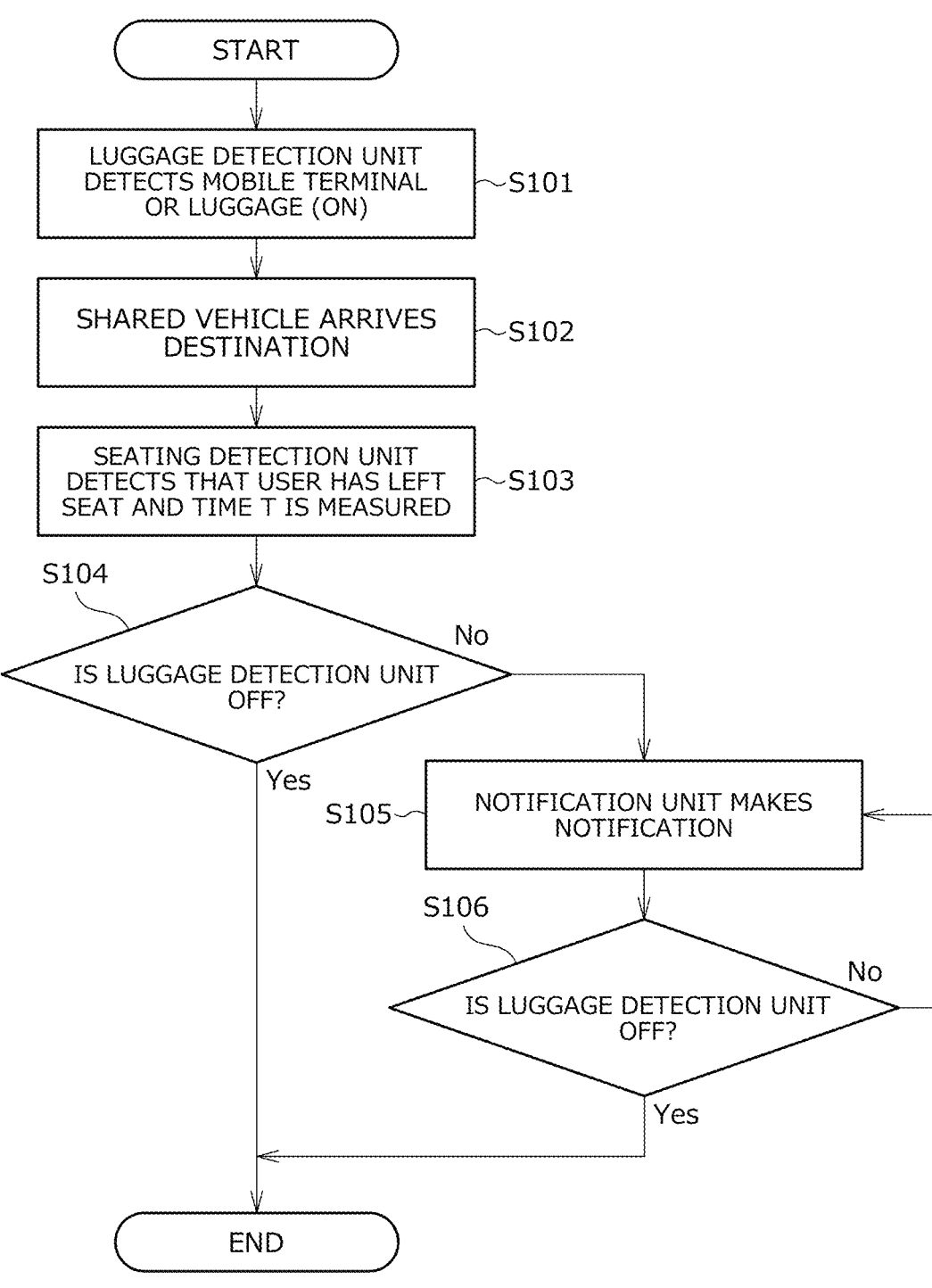
FIG. 3 is a flowchart of a notification process.

FIG. 2 illustrates a block diagram of the notification system 1. The ECU 20 operates as a control unit of the present embodiment, is connected to and controls the luggage detection unit 31, the seating detection unit 32, and the notification unit 33, and receives and processes signals transmitted from the luggage detection unit 31 and the seating detection unit 32. In addition, the ECU 20 is connected to and controls a speaker 41, a vibration device 42, a display 43, a seat lamp 44, and a communication device 45 that are the notification units 33. The ECU 20 includes a processor 21, a memory 22 that stores data, and an input and output interface 23.

As illustrated in FIG. 1, the speaker 41 is provided in an upper portion of the shell device 2, and is capable of making a notification to the user seated in the vehicle seat S by means of the sense of hearing. As illustrated in FIG. 1, the vibration device 42 is provided in the seat cushion 11 of the vehicle seat S, and is capable of making a notification to the user by means of vibration. The display 43 is provided in an armrest 3 of the shell device 2, and makes a notification to the user by means of a message or light. The seat lamp 44 is an LED 44a provided in a side portion of the shell device 2, an LED 44b provided in a side portion (for example, in the vicinity of a bead edge) of the vehicle seat S, or an LED 44c provided in a part of the armrest 3, and emits light to make a notification to the user visually.

The processor 21 is a central processing unit that executes various arithmetic processes based on programs or data stored in the memory 22 or signals received from each device connected thereto via the input and output interface 23, and that controls each part of the notification system 1. The memory 22 is, for example, a semiconductor memory, and also functions as a work memory of the processor 21 in addition to storing various programs or data. The input and output interface 23 is connected to the luggage detection unit 31, the seating detection unit 32, and the speaker 41, the vibration device 42, the display 43, the seat lamp 44, and the communication device 45 that are the notification units 33, and communicates with each device.

The seat apparatus 100 includes a luggage storage place 16 in a space below the vehicle seat S. In addition, as illustrated in FIG. 1, a mobile terminal accommodation portion 15 is provided in the armrest 3 of the shell device 2. Incidentally, the luggage 6 in the present embodiment is held and can be carried into the vehicle by the user, and is, for example, a bag. Examples of the luggage 6 also include the mobile terminal 5 such as a smartphone, a mobile phone, a laptop computer, or a tablet terminal. In addition, communicable terminals such as smartphones and mobile phones may be referred to as communication terminals.

The mobile terminal accommodation portion 15 includes a charging device 15a that charges the mobile terminal 5. During getting in, the user connects the mobile terminal 5 to the charging device 15a. The notification unit 33 constantly monitors the state of connection between the charging device 15a and the mobile terminal 5, and checks whether or not the mobile terminal 5 is connected. The charging device 15a may be a wireless electric power supply that charges a mobile phone with electromagnetic waves. In this case, the luggage detection unit 31 detects whether or not the charging device 15a is charging the mobile terminal 5.

When the luggage 6 carried into the vehicle by the user is a bag, a laptop computer, or a tablet terminal, the user can place the luggage 6 in the luggage storage place 16 provided below the vehicle seat S. A load sensor 31a is provided under the luggage storage place 16 and detects the load of the luggage 6, so that the luggage detection unit 31 checks the presence or absence of the luggage 6. The load sensor 31a may also be provided in the seat cushion 11 of the vehicle seat S. In this case, not only a seated occupant but also the luggage 6 misplaced on the seat cushion 11 may be detected. The load sensor 31a may also be provided in the mobile terminal accommodation portion 15, and may detect the load of the mobile terminal 5 to detect a presence of the mobile terminal 5 even when a charge state or the connection state of a charger is not detected.

In addition to the load sensor 31a, infrared sensors 31b or ultrasonic sensors 31c may be installed in the mobile terminal accommodation portion 15 and the luggage storage place 16, respectively, to check the presence or absence of the luggage 6 using infrared rays or ultrasound waves.

In addition, as described above, the notification unit 33 may be the speaker 41 provided in the shell device 2. When the luggage detection unit 31 detects the misplaced luggage 6, the ECU 20 causes the speaker 41 to issue a warning sound to notify the user that there is the misplaced mobile terminal 5 or the misplaced luggage 6.

As described above, the notification unit 33 in the present embodiment is, for example, the display 43 or the seat lamp 44 of the shell device 2. When the luggage detection unit 31 detects the misplaced mobile terminal 5 or the misplaced luggage 6, the ECU 20 causes the seat lamp 44 to emit light or causes the display 43 to display a message to notify the user that there is the misplaced mobile terminal 5 or the misplaced luggage 6.

The notification unit 33 may be the communication device 45 provided in the notification system 1. When the luggage detection unit 31 detects the misplaced luggage, the ECU 20 transmits a predetermined message to the mobile terminal 5 to notify the user that the misplaced mobile terminal 5 or the misplaced luggage 6 has been detected, the mobile terminal 5 being owned by the user.

Next, a notification process executed by the notification system 1 will be described using the flowchart in FIG. 3.

First, the ECU 20 causes the luggage detection unit 31 to detect a presence of the mobile terminal 5 or the luggage 6 (S101). Next, the shared vehicle arrives a destination (S102). The ECU 20 causes the seating detection unit 32 to detect whether or not the user has left the vehicle seat S. When it is detected that the user has left the seat, for example, when it is detected that a load applied to the seat cushion 11 has been reduced, the ECU 20 measures a time T from when the user has left the seat (S103). When a predetermined time from the start of the measurement, for example, two seconds have elapsed, the ECU 20 causes the luggage detection unit 31 to detect whether or not the mobile terminal 5 or the luggage 6 is present, namely, determines whether or not the luggage detection unit 31 is OFF (S104). When the luggage detection unit 31 does not detect the mobile terminal 5 or the luggage 6 (in the case of YES in S104), the ECU 20 determines that there is no misplaced mobile terminal 5 or misplaced luggage 6, and ends the notification process.

When the luggage detection unit 31 detects the mobile terminal 5 or the luggage 6 (in the case of NO in S104), the ECU 20 determines that there is the misplaced mobile terminal 5 or the misplaced luggage 6, and commands the notification unit 33 to make a notification (S105). For example, the ECU 20 commands the speaker 41 to issue a predetermined sound. In addition, for example, the ECU 20 commands the display 43 to display a predetermined message or commands the seat lamp 44 to blink. In addition, the ECU 20 may command the communication device 45 to send a message to the mobile terminal 5 of the user.

After the notification unit 33 makes a notification indicating that there is a misplaced item, the ECU 20 checks whether or not the luggage detection unit 31 does not detect the luggage 6 (whether or not the luggage detection unit 31 is not OFF) (S106). When the user carries the misplaced luggage, and detection of the luggage detection unit 31 is OFF (in the case of YES in S106), the ECU 20 determines that there is no misplaced luggage 6, and ends the process. When the luggage detection unit 31 detects the luggage 6 (in the case of NO in S106), the ECU 20 returns to S105, and causes the user to be notified of misplacement of the luggage again. This notification is performed until the luggage detection unit 31 does not detect the mobile terminal 5 or the luggage 6, but after the notification process is performed for a predetermined time or a predetermined number of times, the notification process may be ended.

Figure 4A:
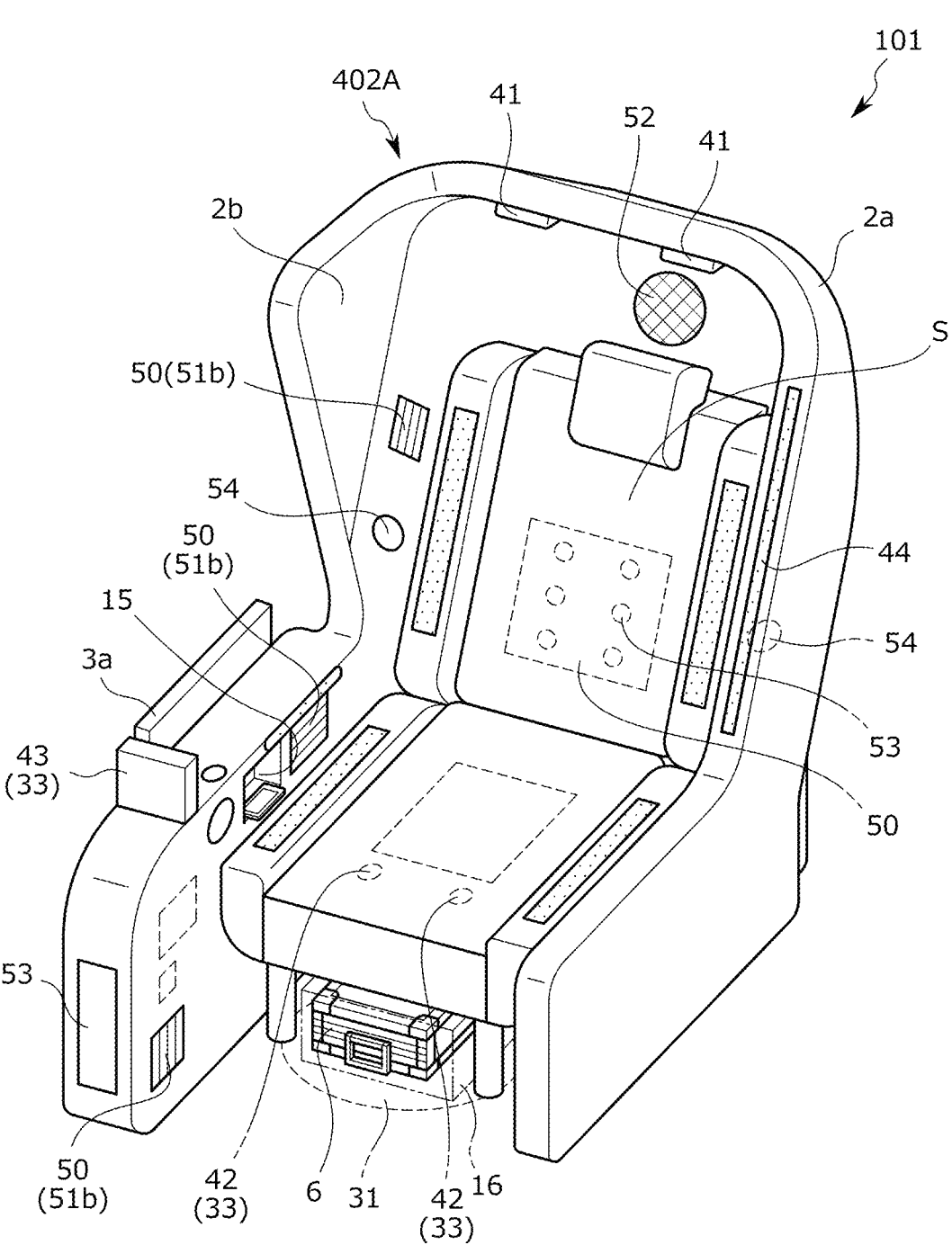
FIG. 4A is a perspective view illustrating an exterior of a vehicle seat and a seat apparatus provided with a shell device.

Next, a shell device 402A of a seat apparatus 101 will be described with respect to FIG. 4A. As described above, the shell device 402A is an enclosure provided with the aim of blocking the eyes of a neighboring user and securing the privacy of the user seated in the vehicle seat S. As illustrated in FIG. 4A, the shell device 402A includes a shell portion 2a formed to cover the right, left, and upper portions of the vehicle seat S, and a shade portion 2b disposed to hide a user who is neighbored laterally when the user is seated.

In addition, as illustrated in FIG. 4A, the armrest 3 is provided to be located on a right side of the seated user. The armrest 3 may be provided to be located on a left side of the user.

The shade portion 2b is formed to cover also a lateral side of the arm of the user. Therefore, a screen of the mobile terminal can be prevented from being viewed when the mobile terminal is operated. The shade portion 2b can be accommodated or transparent. A partition formed by the shade portion 2b may be an electronic shade (electronic curtain) or may be configured to become nontransparent when the user turns on and off a switch to apply a voltage.

In addition, the accommodation and transparency of the shade portion 2b may be enabled only when both neighboring users perform an operation. Since the shade portion 2b is provided, the privacy of the user who is an occupant can be secured.

A partition 3a that is low may be provided in an upper portion of the armrest 3. Since the partition 3a is provided in the armrest 3, the hands of neighboring users can be prevented from touching each other. The partition 3a may be storable or may be provided so as to be retractable by the user.

The ease of getting in and out is improved by lowering the height of a portion on a side opposite the armrest 3, namely, usually on a door side (not neighbored to another user). Incidentally, the portion on the side opposite the armrest 3, of which the height is lowered, may be configured such that the portion is stored when the user gets in and out, and after getting in and out, the portion is deployed to cover a side portion and an upper portion of the vehicle seat S.

Since the shell portion 2a also covers the upper portion of the vehicle seat S and an upper portion of the user seated therein, the speaker 41 can be disposed such that a sound can be heard only by the seated user.

Figure 6A:
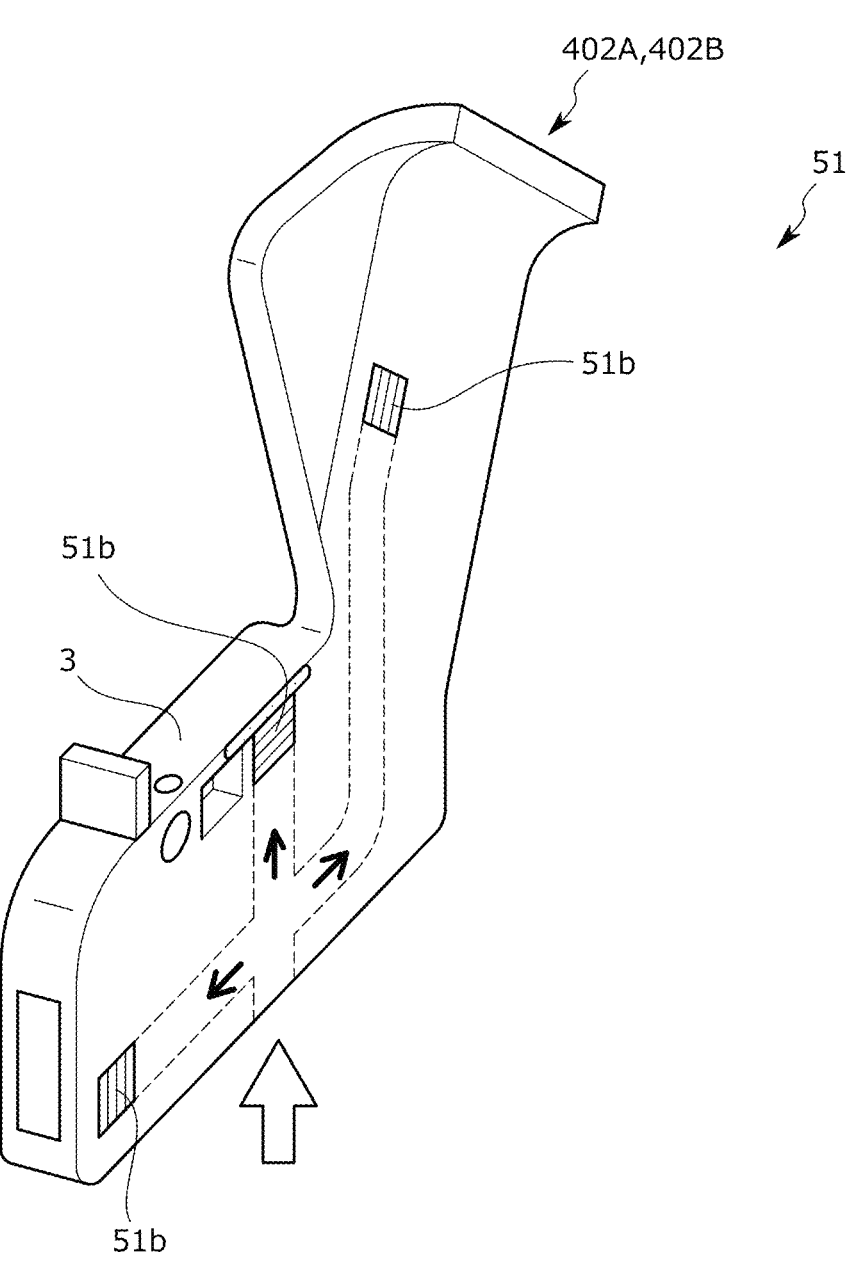
FIG. 6A is a view illustrating a method for supplying cold and warm air in an air conditioning device.
Figure 6B:
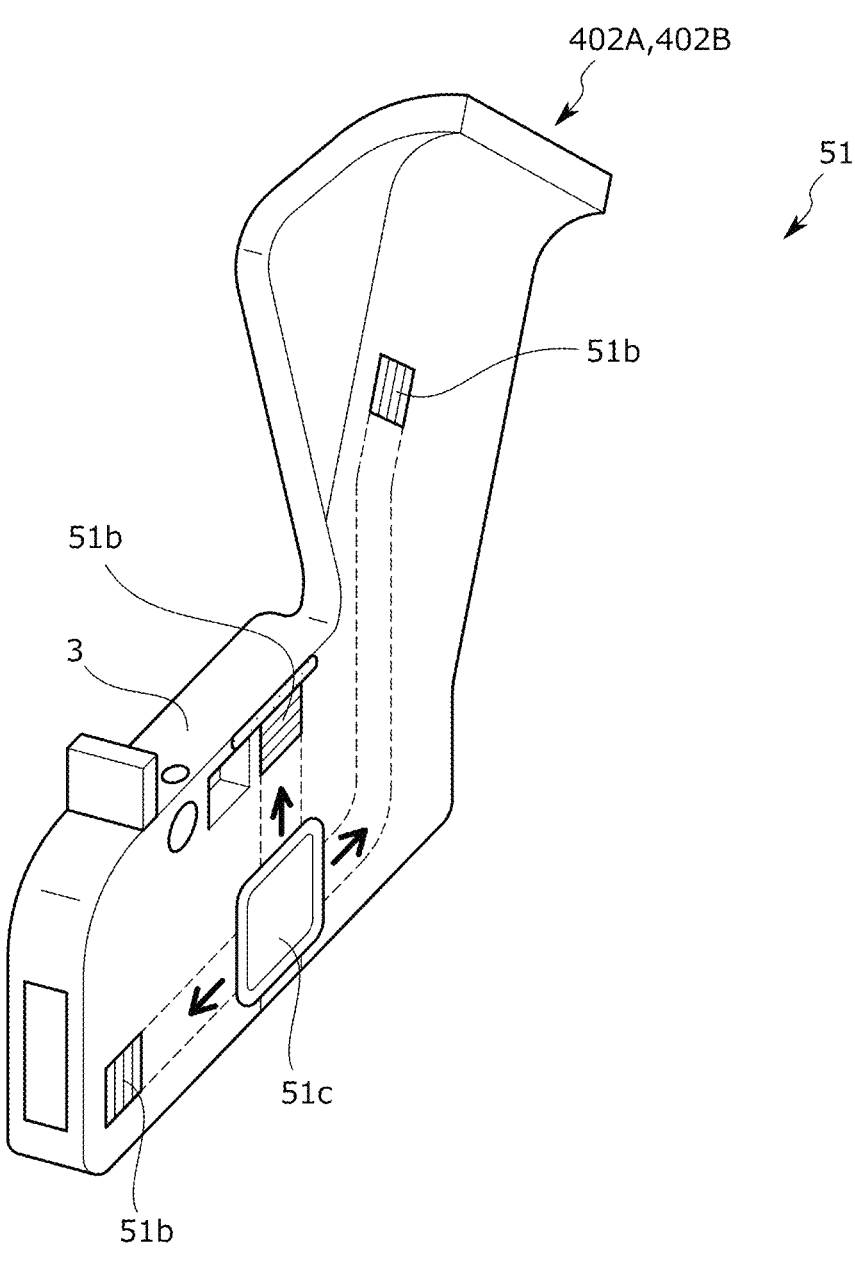
FIG. 6B is a view illustrating another example of a method for supplying cold and warm air in the air conditioning device.

As illustrated in FIG. 4A, the armrest 3 of the shell device 402A may be provided with an air conditioning device 51. Since the air conditioning device 51 is provided in the shell device 2, cooling and heating can be performed from a position close to the user. As illustrated in FIG. 6A, an air blowing duct 51b of the air conditioning device 51 is disposed inside the shell device 402A to be capable of supplying warm air or cold air to the vicinities of the feet and the neck of the seated user. Warm air and cold air may be supplied from an air conditioning device (A/C) installed in a vehicle body of the shared vehicle. Warm air and cold air may be supplied from heating, ventilation, and air conditioning (HVAC) 51c that is built in a lower inside of the armrest 3 as illustrated in FIG. 6B.

Figure 5A:
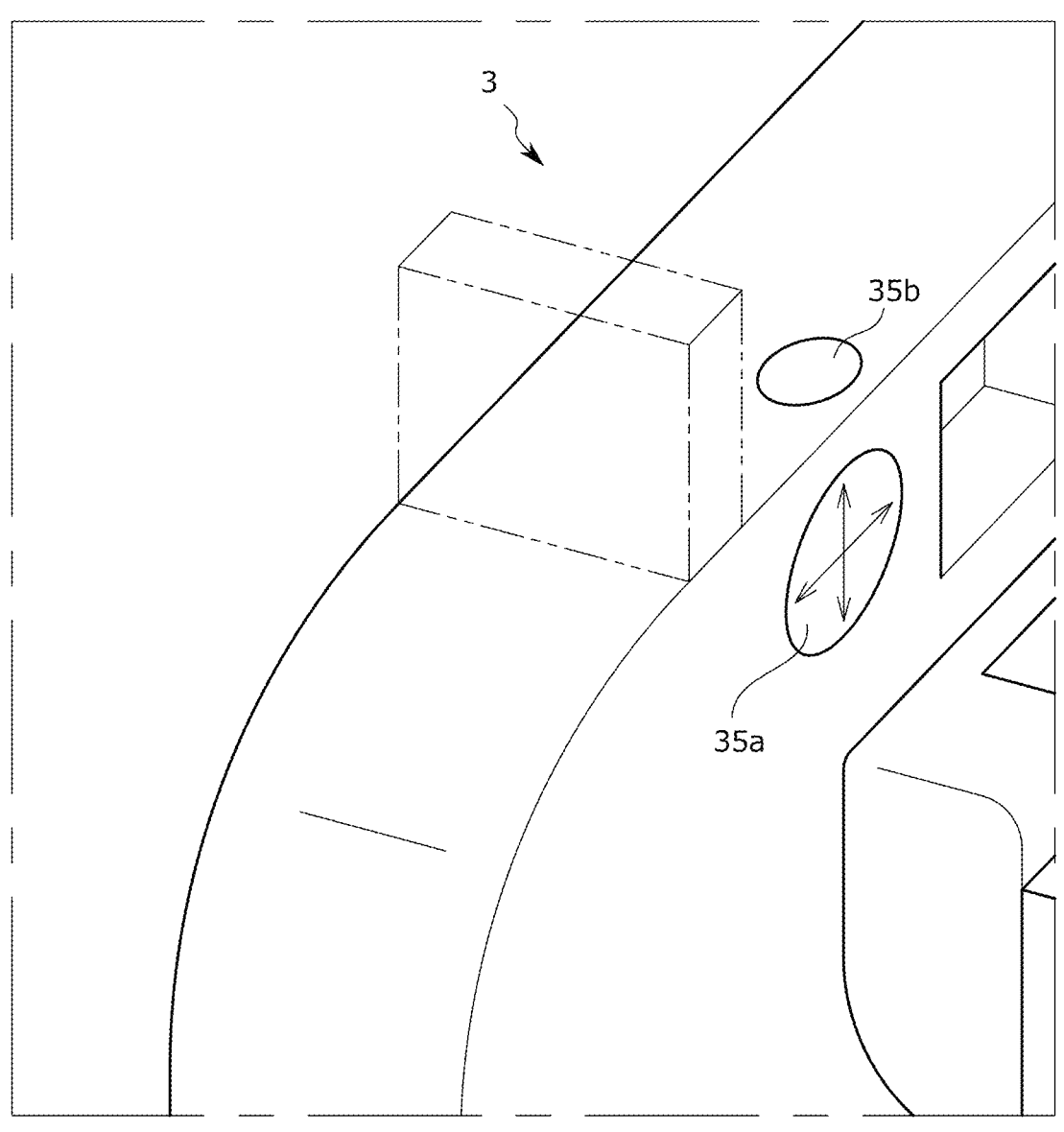
FIG. 5A is a perspective view illustrating an operation switch provided in an armrest of the shell device.
Figure 5B:
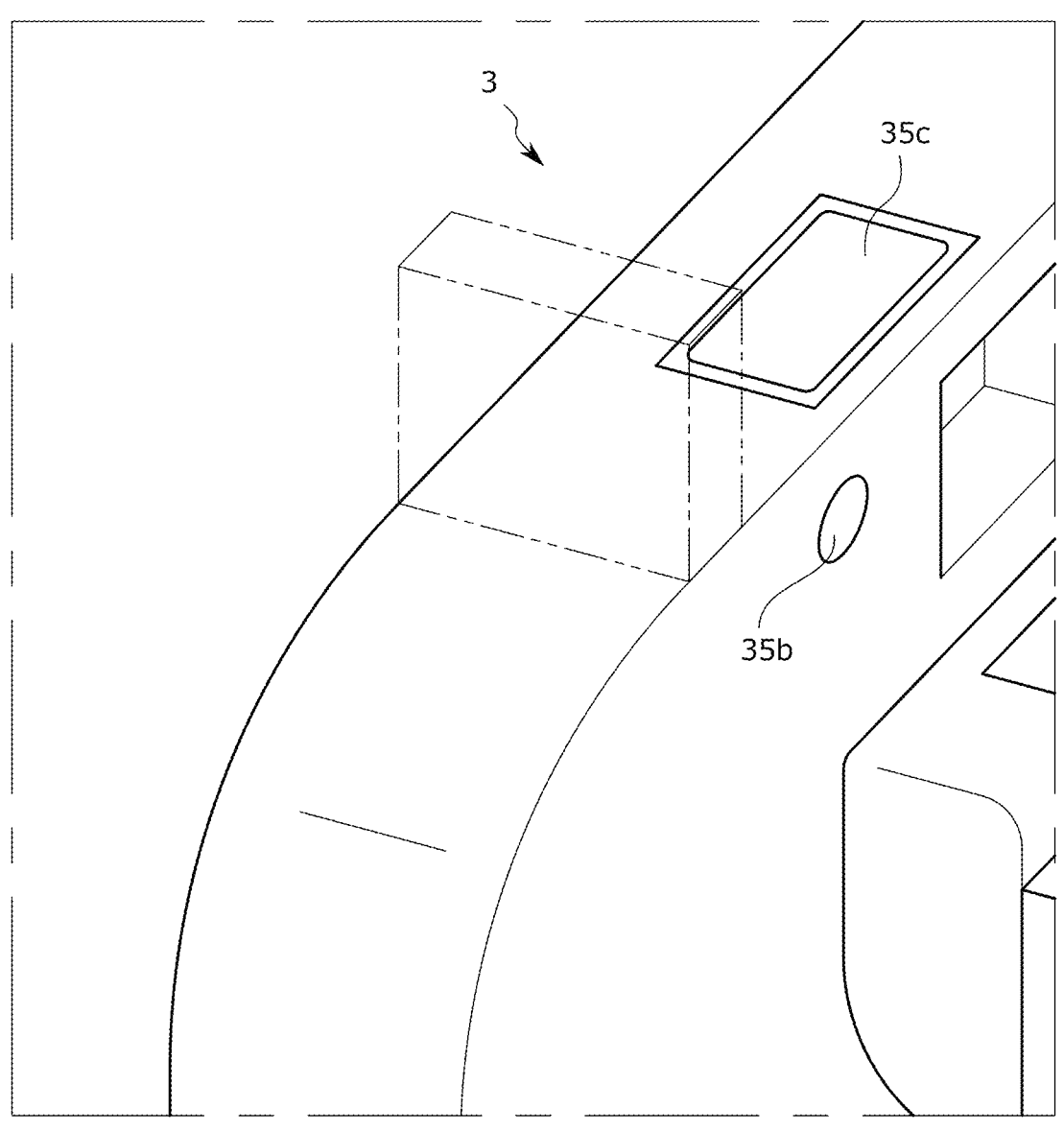
FIG. 5B is a perspective view illustrating another example of an operation switch provided in the armrest of the shell device.

In addition, as illustrated in FIG. 5A, the armrest 3 may be provided with an operation switch 35. In a state where the vehicle seat S is reclined, the position of an operation panel (instrument panel) such as the display 43 is distant therefrom. Therefore, when the operation switch 35 is provided in the armrest 3 such that the operation switch 35 can be performed in the vicinity of the hand at a seated position, the user can perform an operation in the vicinity of the hand. The operation switch 35 may be configured such that switches having different functions are provided in different surfaces, for example, an upper surface and a side surface of the armrest 3. For example, as illustrated in FIG. 5A, a cross key 35a and a determination key 35b may be disposed in an inner side surface and the upper surface, respectively. In addition, as illustrated in FIG. 5B, the determination key 35b and a touchpad 35c may be disposed in the side surface and the upper surface, respectively. Since the keys are disposed in different surfaces of the armrest 3, grasping according to a shape along the shape of the hand is facilitated, and operation is also facilitated.

In addition, as illustrated in FIG. 4A, the shell device 402A may be provided with an odor eliminating and deodorizing device 52. Since the shared vehicle is used by a plurality of users, odor may be a concern. Therefore, in order to eliminate or deodorize odor inside the vehicle, the odor eliminating and deodorizing device 52 is provided in the upper portion of the shell device 2.

A massage device 53 may be provided in the seat back 10 of the vehicle seat S. In addition, a heater or an adaptive variable suspension system (AVS) may be provided in the seat back 10. A non-contact sensing device 50 that measures a heart rate or the like may be provided in the seat back 10. Health can also be managed by measuring data such as heart rate whenever used.

In addition, spot lamps 54 to be used as reading lamps or the like may be provided in the shell device 402A on both sides of the seat back 10. Since a user sitting around may sleep, during traveling of the shared vehicle, a light inside the vehicle may be turned off. In addition, also when the mobile terminal 5 is operated, lighting may be adjustable for each seat. Since the spot lamps 54 that can be individually lighted up are provided, users can individually perform work such as reading.

In addition, as illustrated in FIG. 4A, a work table 55 that is storable in the armrest 3 may be built in the shell device 2. Since the work table 55 is provided, the user can perform work using, for example, a computer or the like, or have a meal.

Figure 4B:
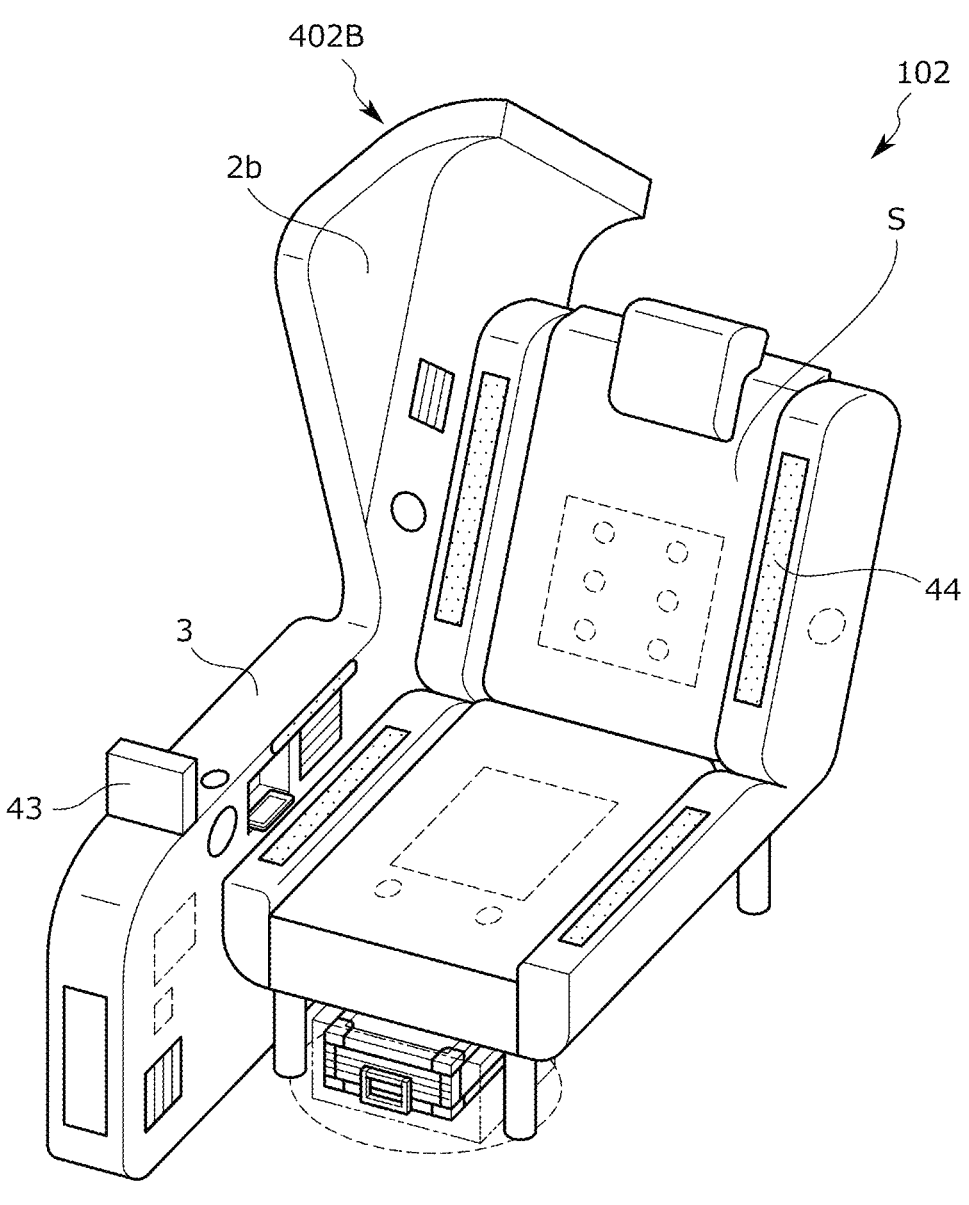
FIG. 4B is a perspective view illustrating an exterior of another example of a seat apparatus.

Incidentally, the shell device 2 illustrated in FIG. 4A is provided to surround the upper portion and the side portion of the vehicle seat S, however, as in a seat apparatus 102 illustrated in FIG. 4B, a shell device 402B that includes the shade portion 2b and surrounds only a right part of the user may be provided in the vehicle seat S (side portion facing an adjacent seat). The shade portion 2b of the shell device 402B is provided to block the line of sight from the adjacent seat.

Next, a reserved seat notification system 701 will be described with reference to FIGS. 7 and 8.

When the shared vehicle is used, the user himself or herself may not find which seat is reserved since there are the plurality of seats. Therefore, a system that makes a notification about the reserved seat is established.

Figure 7:
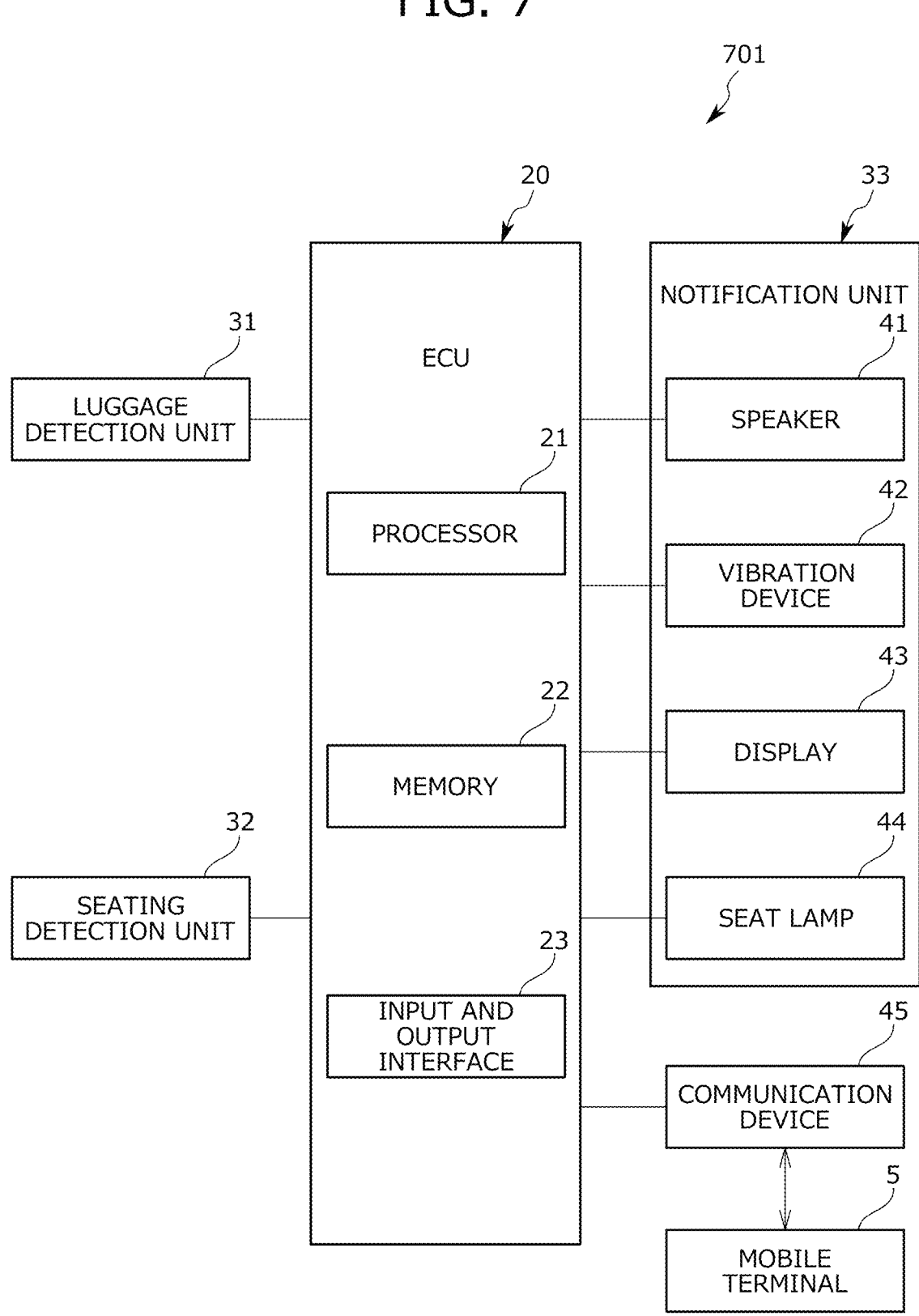
FIG. 7 is a block diagram illustrating the ECU of a reserved seat notification system and control targets of the ECU.
Figure 8:
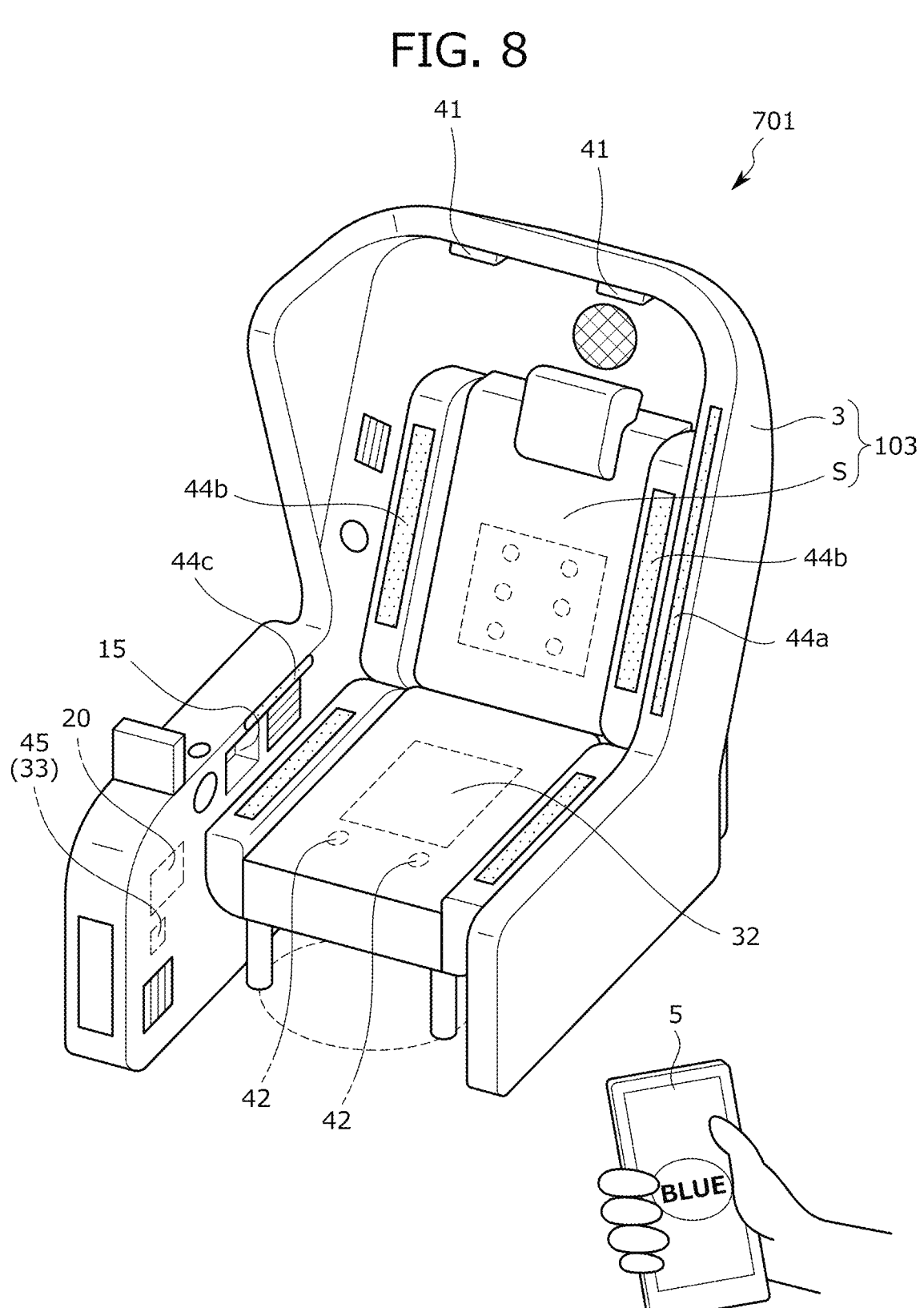
FIG. 8 is a perspective view illustrating a state of a seat apparatus linked with a mobile terminal.

A configuration of the reserved seat notification system 701 is illustrated in FIG. 7. Components having the same functions as those of the notification system 1 illustrated in FIG. 2 are denoted by the same reference signs, and a detailed description thereof will be omitted.

The reserved seat notification system 701 includes the vehicle seat S; the ECU 20 (control unit) that stores reservation information of the user; the communication device 45 capable of communicating with a communication terminal (mobile terminal 5) held by the user; and the notification unit 33 provided on the vehicle seat S or in the vicinity of the vehicle seat S. The communication device 45 receives personal information of the user for specifying the user from the communication terminal (mobile terminal 5), and the ECU 20 compares the personal information of the user with the reservation information, and notifies the notification unit 33 of user identification information, for example, the location of the reserved seat or the like when the personal information of the user coincides with the reservation information.

The notification unit 33 of the reserved seat notification system 701 is, for example, the seat lamp 44, and the seat lamp 44 provided in the vehicle seat S emits light to notify the user that the vehicle seat S is the reserved seat (seat apparatus 103). For example, as illustrated in FIG. 8, the seat lamp 44 is the LED 44a provided in the side portion of the vehicle seat S, 44b provided in the side portion of the shell device 2, or the LED 44c provided in a part of the armrest 3. Since the seat lamp 44 is located so as to be easily visible to the user, the user easily finds his or her own seat.

In addition, color displayed on the mobile terminal 5 and color of light emitted by the seat lamp 44 may be the same color. For example, as illustrated in FIG. 8, when blue color is displayed on a screen of the mobile terminal 5, the ECU 20 that has received the reservation information or the like causes the seat lamp 44 to emit light of the same blue color. When a plurality of users uses the reserved seat notification system 701 at the same time, a different color is displayed for each seat. Therefore, the user can easily find the location of his or her own reserved seat (seat apparatus 103).

The seat lamp 44 is turned off when the seating detection unit 32 provided in the vehicle seat S detects that the user has been seated and the ECU 20 detects that the correct user has been seated. For example, the ECU 20 detects that the correct user has been seated, based on a determination as to whether or not the user owns the mobile terminal 5 used for reservation. More specifically, the mobile terminal 5 is placed in the mobile terminal accommodation portion 15 (luggage detection unit 31), so that the mobile terminal accommodation portion 15 reads and detects personal information or the like of the mobile terminal 5. When the user who has made a reservation is different from the seated user, for example, when the seated user owns the mobile terminal 5 different from that used for reservation, the notification unit 33 notifies the seated user of a warning.

The notification unit 33 may be the seat lamp 44, and for example, the seat lamp 44 blinks to notify that the user is seated in a wrong seat. In addition, when the notification unit 33 is, for example, the display 43, the display 43 displays a message telling that the user is seated in a wrong seat. When the notification unit 33 is the speaker 41, the speaker 41 issues a sound to notify the user of a warning by means of the sense of hearing. The notification unit 33 may be the vibration device 42 provided in the seat cushion 11, and in this case, the vibration device 42 makes vibration to notify the user that the user is seated in a wrong seat.

Figure 9:
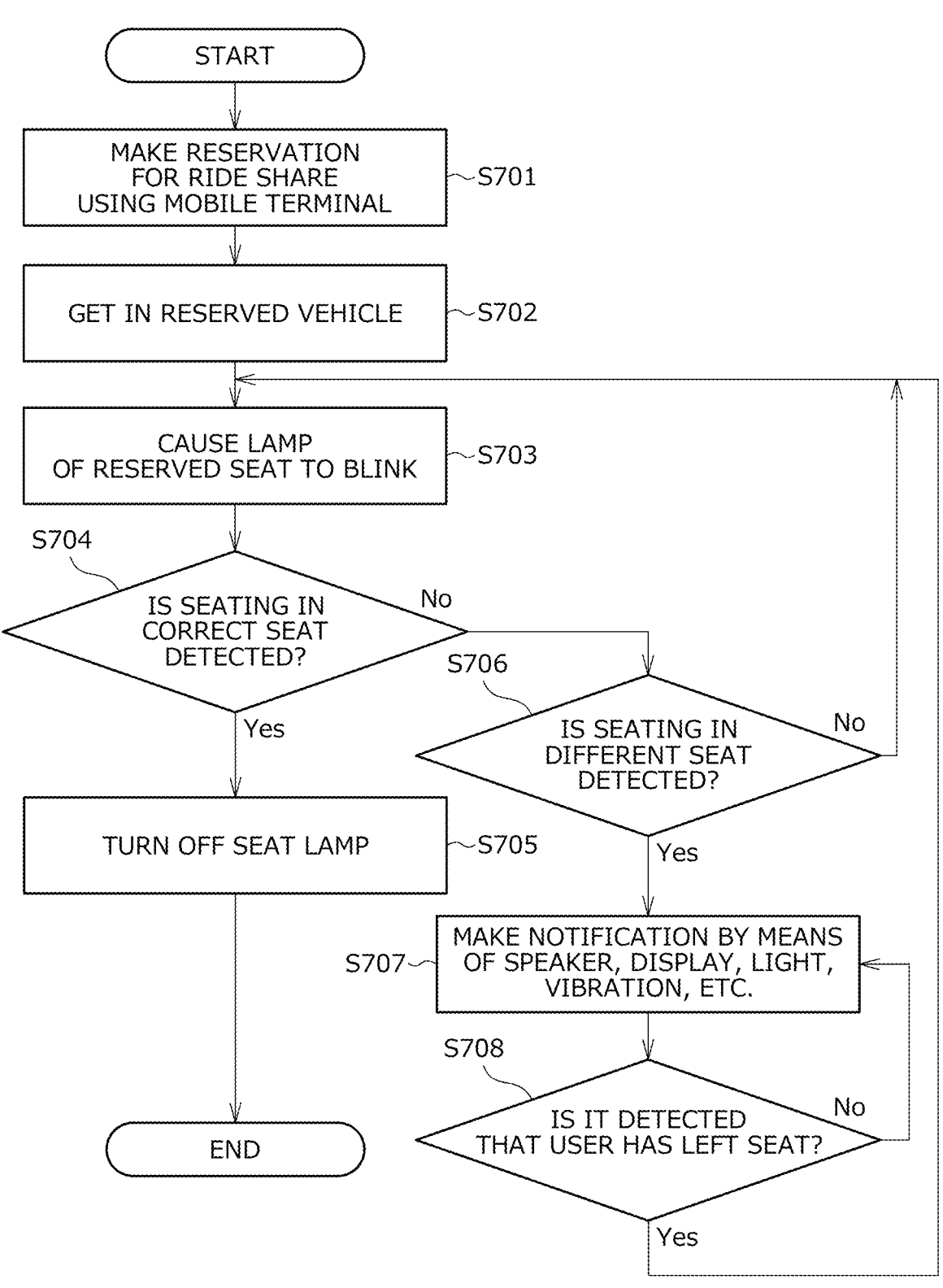
FIG. 9 is a flowchart of a notification process of notifying a user of a reserved seat.

A notification process performed by the reserved seat notification system 701 will be described with reference to FIG. 9. First, the user makes a reservation for a ride share using the mobile terminal 5 owned by the user (S701). The user gets in a reserved shared vehicle (S702). The ECU 20 receives personal information of the user for specifying the user from the mobile terminal 5 of the user via the communication device 45. Then, reservation information stored in the memory 22 and the personal information of the user are compared with each other to check whether or not both information coincide with each other, and the seat lamp 44 of a reserved seat blinks (S703).

The seating detection unit 32 confirms that the user has been seated. At this time, the ECU 20 receives the personal information of the user again, and determines whether or not information of a reservation person of the vehicle seat S coincides with the personal information of the seated user (S704). When it is determined that the seated user is a correct user (YES in S704), the seat lamp 44 is turned off (S705). When the information of the reservation person does not coincide with the personal information of the user (NO in S704), the ECU 20 determines whether or not it is detected that the user is seated in the different vehicle seat S (S706). When it is detected that the user has been seated in the different seat (in the case of NO in S706), the process returns to S703, and the seat lamp 44 of the correct reserved seat blinks. Accordingly, the user is guided to the correct seat. In addition, when it is detected that the user has been seated in the different seat (YES in S706), the speaker 41, the vibration device 42, the display 43, or the seat lamp 44 that is the notification unit 33 notifies the seated user that the seat is a wrong seat (S707).

The ECU 20 causes the seating detection unit 32 to check whether or not the user has left the different seat (S708). When the seating detection unit 32 cannot confirm that the user has left the seat (NO in S708), the process returns to S707, and the ECU 20 causes the notification unit 33 to notify the seated user of a warning again. When it is confirmed that the user has left the seat, the process returns to S703, and the seat lamp 44 of the reserved seat blinks to notify the user of the position of the correct seat.

Next, an ottoman 13 provided in the vehicle seat S provided in a seat apparatus 104 will be described with reference to FIGS. 10 to 11B. It is assumed that the user using the shared vehicle is seated in a state where the vehicle seat S is reclined. Therefore, when the vehicle seat S is provided with the ottoman 13 that supports the legs of the user during seating, the user can be seated in a more relaxed state. However, when a surface of the ottoman 13 on which the legs are placed is flat, the legs may be shifted by a lateral acceleration (lateral G) induced by the sharp turning of the vehicle body when a steering wheel is steered during movement. Therefore, it is desirable that even when the lateral G is applied in the reclined state, the shift of the legs is suppressed.

Figure 10:
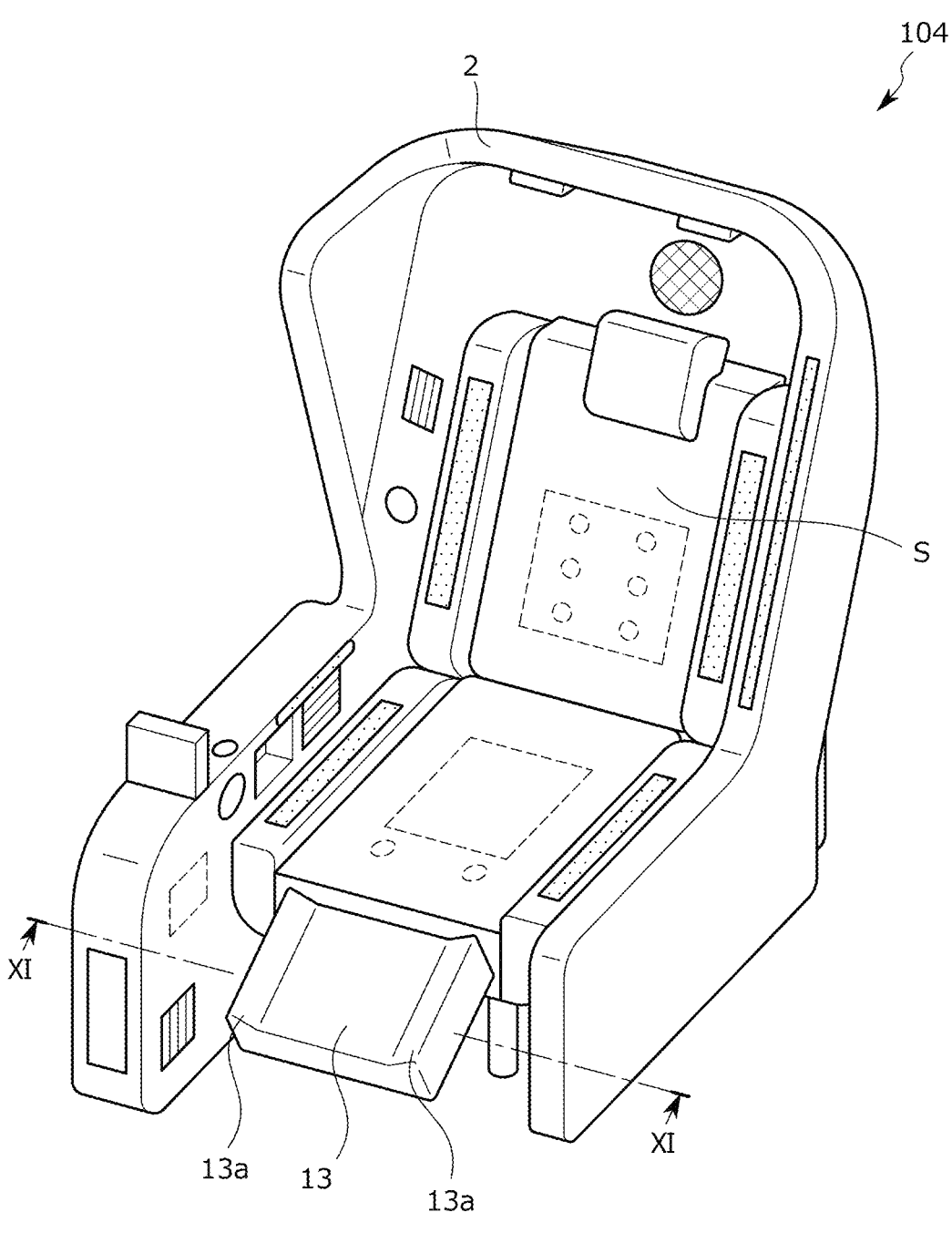
FIG. 10 is a perspective view of a seat apparatus provided with a vehicle seat including an ottoman.

As illustrated in FIG. 10, the vehicle seat S includes the ottoman 13. Since the seat apparatus is the same as the seat apparatus 100 illustrated in FIG. 1 except for including the ottoman 13, a description of configurations other than the ottoman 13 will be omitted.

Figure 11A:
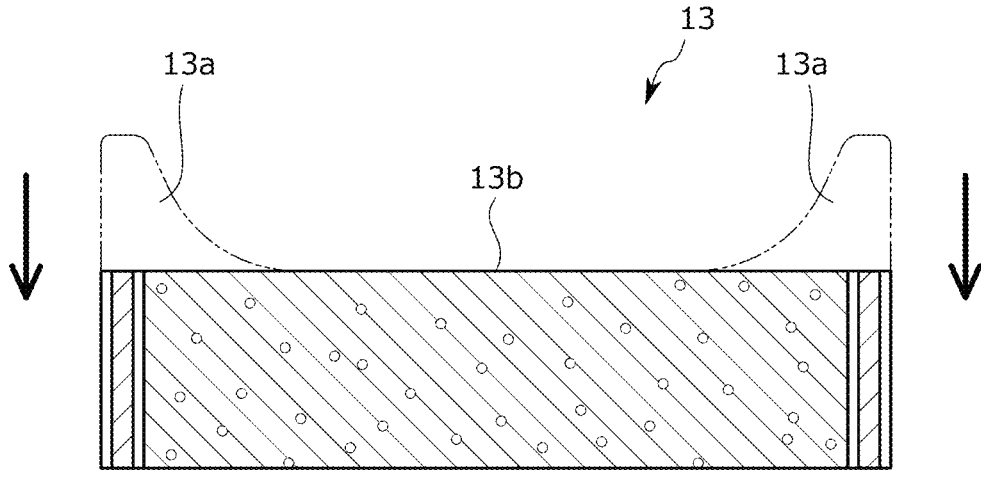
FIG. 11A is a cross-sectional view illustrating a state of the ottoman during getting in and out.
Figure 11B:
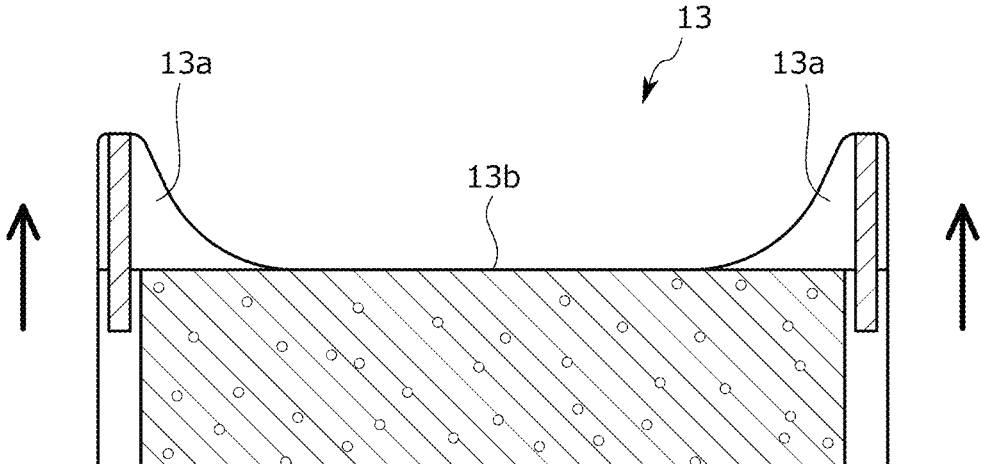
FIG. 11B is a cross-sectional view illustrating a state of the ottoman during seating.

As illustrated in FIG. 10, the ottoman 13 is attached to a front of the seat cushion 11, and depending on a seated state of the user, can be inclined and extended by, for example, a drive mechanism provided in the ottoman 13. In addition, retractable step portions 13a are provided on both side portions of the ottoman 13. When the user gets in and out, as illustrated in FIG. 11A, the step portions 13a are stored, and a seat surface 13b on which the legs are placed is substantially flat. Then, as illustrated in FIG. 11B, when the user gets in and is seated in the seat, the step portions 13a are deployed to protrude from the seat surface 13b. Even when the vehicle body is sharply turned, the legs of the user abut against the step portions 13a, so that the legs are suppressed from being shifted from the ottoman 13. The deployment of the step portions 13a may be realized using air or mechanical means.

In the above embodiment, as a specific example, the notification system used in the shared vehicle has been described, however, the notification system is not limited to being applied to the shared vehicle, and the notification system of this application can be provided as a seat of trains, buses, or the like, and can also be used in a seat of airplanes or ships.

REFERENCE SIGNS LIST

1: notification system
100, 101, 102, 104: seat apparatus
701: reserved seat notification system
2, 402A, 402B: shell device
2a: shell portion
2b: shade portion
3: armrest
3a: partition
5: mobile terminal
6: luggage
10: seat back
11: seat cushion
12: headrest
13: ottoman
13a: step portion
15: mobile terminal accommodation portion
15a: charging device

16: luggage storage place
20: control unit (ECU)
21: processor
22: memory
23: input and output interface
31: luggage detection unit
32: seating detection unit
33: notification unit
35: operation switch
35a: cross key
35b: determination key
35c: touchpad
41: speaker (notification unit)
42: vibration device (notification unit)
43: display (notification unit)
44: seat lamp (notification unit)
44a, 44b, 44c: LED
45: communication device (notification unit)
50: sensing device
51: air conditioning device
51b: air blowing duct
51c: HVAC
52: odor eliminating and deodorizing device
53: massage device
54: spot lamp
55: work table
S: vehicle seat

The invention claimed is:

1. A notification system, comprising:
a seat;
a control unit that stores reservation information of a user who reserved the seat;
a communication device capable of communicating with a communication terminal owned by the user;
a notification unit provided on the seat or in the vicinity of the seat and that notifies an information to the user;
a seating detection unit that detects whether or not the user is seated on the seat;
an accommodation portion provided in the vicinity of the seat in which the communication terminal can be placed; and
a luggage detection unit that detects a presence of the communication terminal in the accommodation portion,
wherein the control unit controls the communication device and the notification unit,
wherein the notification unit includes a seat lamp,
wherein the control unit causes the seat lamp of the seat to emit light when the control unit receives a personal information for specifying the user from the communication terminal and the control unit compares the reservation information with the personal information and the personal information coincides with the reservation information,
wherein the control unit is configured to turn off the seat lamp when the seating is detected by the seating detection unit and the personal information received from the communication terminal owned by the user seated in the seat coincides the reservation information, and
wherein the control unit receives the personal information from the communication terminal when the luggage detection unit detects the communication terminal.

2. The notification system according to claim 1, wherein the control unit causes the seat lamp to emit light of the same color as a color displayed on a screen of the user's communication terminal.

3. The notification system according to claim 1,
wherein a plurality of the seats is provided,
wherein the control unit is configured to display a different color on a screen for each communication terminal when the personal information is simultaneously received from communication terminals of a plurality of users, and
wherein the control unit causes the seat lamp of the seat reserved by the user to emit light of the same color as the color displayed on the screen of the user's communication terminal.

4. The notification system according to claim 1,
wherein the control unit notifies the user of a warning by using the notification unit when the personal information received from the communication device owned by the user seated in the seat differs from the reservation information.

5. The notification system according to claim 4,
wherein the notification unit includes a display, a speaker, and vibration device, and
wherein the control unit notifies the user of the warning by using the notification unit in any one of a light, a sound, a vibration, and a message display.

6. The notification system according to claim 1,
wherein the seat includes a seat back, a seat cushion, a headrest, an armrest, an ottoman, and a reclining mechanism.

7. A notification system, comprising:
a seat;
a control unit that stores reservation information of a user who reserved the seat;
a communication device capable of communicating with a communication terminal owned by the user;
a notification unit provided on the seat or in the vicinity of the seat and that notifies an information to the user; and
a seating detection unit that detects whether or not the user is seated on the seat,
wherein the control unit controls the communication device and the notification unit,
wherein the notification unit includes a seat lamp,
wherein the control unit causes the seat lamp of the seat to emit light when the control unit receives a personal information for specifying the user from the communication terminal and the control unit compares the reservation information with the personal information and the personal information coincides with the reservation information,
wherein the control unit is configured to turn off the seat lamp when the seating is detected by the seating detection unit and the personal information received from the communication terminal owned by the user seated in the seat coincides the reservation information,
wherein the control unit notifies the user of a warning by using the notification unit when the personal information received from the communication terminal owned by the user seated in the seat differs from the reservation information, and
wherein, when the control unit confirms that the user left the seat after the control unit notifies the user of the warning by using the notification unit, the control unit causes the seat lamp of the seat reserved by the user who left the seat to emit light.

8. The notification system according to claim 7,
wherein the control unit causes the seat lamp to emit light of the same color as a color displayed on a screen of the user's communication terminal.

9. The notification system according to claim 7,
wherein a plurality of the seats is provided,
wherein the control unit is configured to display a different color on a screen for each communication terminal when the personal information is simultaneously received from communication terminals of a plurality of users, and
wherein the control unit causes the seat lamp of the seat reserved by the user to emit light of the same color as the color displayed on the screen of the user's communication terminal.

10. The notification system according to claim 7,
wherein the notification unit includes a display, a speaker, and vibration device, and
wherein the control unit notifies the user of the warning by using the notification unit in any one of a light, a sound, a vibration, and a message display.

11. The notification system according to claim 7,
wherein the seat includes a seat back, a seat cushion, a headrest, an armrest, an ottoman, and a reclining mechanism.

12. A notification system-according to claim 4, comprising:
a seat;
a control unit that stores reservation information of a user who reserved the seat;
a communication device capable of communicating with a communication terminal owned by the user;
a notification unit provided on the seat or in the vicinity of the seat and that notifies an information to the user; and
a seating detection unit that detects whether or not the user is seated on the seat,
wherein the control unit controls the communication device and the notification unit,
wherein the notification unit includes a seat lamp,
wherein the control unit causes the seat lamp of the seat to emit light when the control unit receives a personal information for specifying the user from the communication terminal and the control unit compares the reservation information with the personal information and the personal information coincides with the reservation information,
wherein the control unit is configured to turn off the seat lamp when the seating is detected by the seating detection unit and the personal information received from the communication terminal owned by the user seated in the seat coincides the reservation information,
wherein the control unit notifies the user of a warning by using the notification unit when the personal information received from the communication terminal owned by the user seated in the seat differs from the reservation information, and
wherein, when the control unit cannot confirm that user left the seat after the control unit notifies the user of the warning by using the notification unit, the control unit notifies the user of the waring by using the notification unit again.

13. The notification system according to claim 12,
wherein the control unit causes the seat lamp to emit light of the same color as a color displayed on a screen of the user's communication terminal.

14. The notification system according to claim 12,
wherein a plurality of the seats is provided,
wherein the control unit is configured to display a different color on a screen for each communication terminal when the personal information is simultaneously received from communication terminals of a plurality of users, and wherein the control unit causes the seat lamp of the seat reserved by the user to emit light of the same color as the color displayed on the screen of the user's communication terminal.

15. The notification system according to claim 12, wherein the notification unit includes a display, a speaker, and vibration device, and wherein the control unit notifies the user of the warning by using the notification unit in any one of a light, a sound, a vibration, and a message display.

16. The notification system according to claim 12, wherein the seat includes a seat back, a seat cushion, a headrest, an armrest, an ottoman, and a reclining mechanism.

\* \* \* \* \*